Sept. 4, 1962 R. LEE 3,052,806
ELECTRIC MOTORS AND STATORS THEREFOR
Filed Jan. 12, 1960
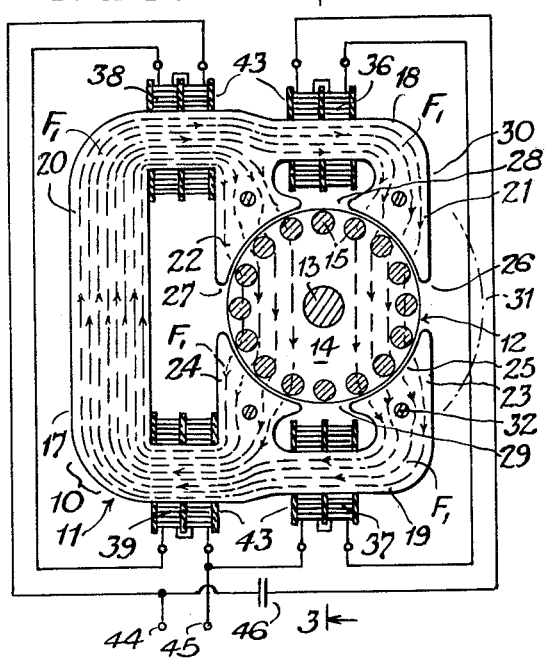
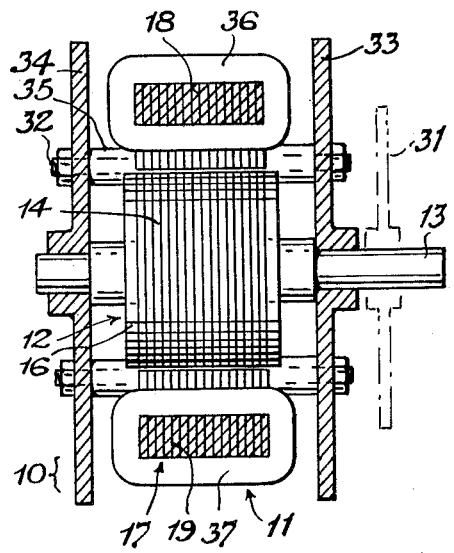
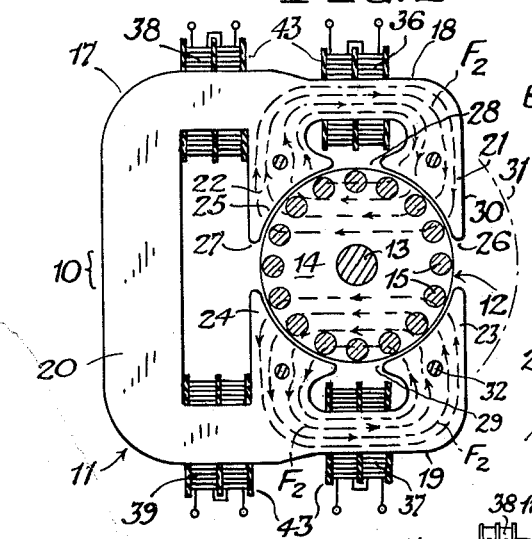
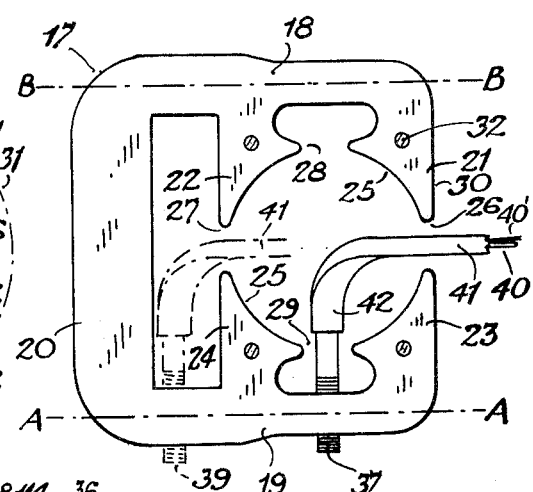
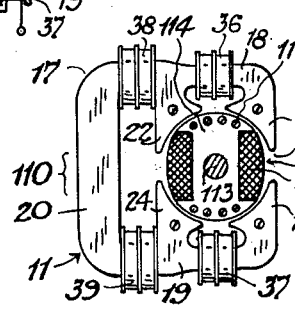
INVENTOR.
ROYAL LEE
BY Christopher L. Neal
ATTORNEY

United States Patent Office 3,052,806
Patented Sept. 4, 1962

3,052,806
ELECTRIC MOTORS AND STATORS THEREFOR
Royal Lee, Box 267, Elm Grove, Wis.
Filed Jan. 12, 1960, Ser. No. 2,011
9 Claims. (Cl. 310—198)

This invention relates to electric motors and to stator structures therefor.

An object of the invention is to provide an electric motor having an improved stator or field structure which will afford relatively efficient motor operation and which is capable of economical manufacture.

Another object is to provide an electric motor of this character which is adapted for operation as a two-phase or split-phase motor.

A further object is to provide a motor stator structure which will facilitate application of field or phase windings thereto, and particularly windings of the ribbon or tape type.

The invention further consists in the several features hereinafter described and claimed.

In the accompanying drawing, FIG. 1 is an end view, partly in section, of a split-phase induction motor constructed in accordance with the invention, circuit connections being shown schematically, and the view also showing flux paths established when the current in one phase winding of the stator is at a maximum;

FIG. 2 is a similar view of the motor, showing the flux paths established when the current in another phase winding is at a maximum;

FIG. 3 is a longitudinal sectional view of the motor taken generally on the line 3—3 of FIG. 1;

FIG. 4 is an end view of the stator core in a partially wound condition, and

FIG. 5 is an end view, partly in section, of a synchronous motor including the same stator as the motor of FIG. 1.

Referring to FIGS. 1 to 3 of the drawing, 10 designates generally a two-phase or split-phase alternating current motor of the invention, the motor comprising a stator 11 and a cooperating rotor 12, and the latter having a shaft 13. The motor is here shown to be of the induction type with a squirrel-cage rotor, but the invention is also applicable to other types of alternating current motors such as synchronous and inductor types. The squirrel-cage rotor 12 includes the usual cylindrical core 14, rotor bars 15, and end rings 16 connected to the rotor bars.

The stator has a laminated magnetizable core 17 including an open-ended C-shaped yoke formed by a pair of generally parallel arms 18 and 19 integrally connected at adjacent ends by a cross portion 20, the cross portion extending at right-angles to the arms and being somewhat wider than the arms. A pair of spaced salient polar projections or pole pieces 21 and 22 are each integrally formed on the inner side of the yoke arm 18, and a similar pair of spaced salient polar projections or pole pieces 23 and 24 are formed on the inner side of the other yoke arm 19, the core being symmetrical about a plane passing midway between the arms. The four polar projections have respective evenly spaced concave pole faces 25 of substantially equal polar arc which lie in a cylindrical surface and define a recess or tunnel receiving the cylindrical rotor core 14. Each pole face extends over an arc of about 75 to 80°, and the centers of the pole faces are spaced 90°. Radii extending from the shaft axis to the centers of the pole faces are disposed at 45° to the length of the stator arms. The two polar projections 21 and 23 at the outer ends of the yoke arms have their adjacent tips spaced to form an opening or gap 26, and the corresponding adjacent tips of the two inner polar projections 22 and 24 are spaced by a similar opening or gap 27. The gaps 26 and 27 facilitate application of stator windings, as hereinafter described. The adjacent pole tips of the polar projections 21 and 22 on the core arm 18 are separated by an opening or gap 28, and a similar opening or gap 29 separates the adjacent pole tips of the polar projections 23 and 24 on the core arm 19. The four openings or gaps 26, 27, 28, and 29 between the pole tips are of substantially equal width. The outer faces 30 of the outer polar projections 21 and 23 lie in a common plane perpendicular to the yoke arms and close to the periphery of the rotor, permitting compact mounting of the motor and allowing adequate radial exposure of a disk-like tool 31 or other rotary driven member which may be carried on the motor shaft. The stator core laminations are each of one-piece construction and are suitably clamped together, as by screw studs 32 passing transversely through the polar projections. The screw studs 32 also secure end plates 33 and 34, FIG. 3, in which the rotor shaft 13 is journalled, and carry spacer sleeves or nuts 35.

Phase winding sections 36, 37, 38 and 39 are wound on the stator yoke arms, as hereinafter described, and are preferably of the spirally wound ribbon or tape type. The winding section 36 surrounds the yoke arm 18 between the spaced polar projections 21 and 22, and the winding section 37 surrounds the yoke arm 19 between the spaced polar projections 23 and 24. The two winding sections 36 and 37, which are series-connected, form a primary phase winding of the motor and are so poled that at any instant the flux produced thereby flows in the same direction in the two core arms. The length of the portion of each yoke arm between the two polar projections thereon is considerably greater than the opening or gap between the adjacent pole tips of these projections. The winding section 38 surrounds the yoke arm 18 between the yoke cross portion 20 and the polar projection 22, and the winding section 39 surrounds the yoke arm 19 between the yoke cross portion and the polar projection 24. The two winding sections 38 and 39, which are series-connected, form the second primary phase winding of the motor and are so poled that at any instant the flux produced is additive and flows in opposite directions in the two yoke arms. The portions of the core arms carrying the winding sections 38 and 39 are preferably wider than the arm portions carrying the winding sections 36 and 37 so as to provide adequate flux-carrying capacity.

The phase windings are desirably formed by insulated metal ribbon or tape 40, such as of copper or aluminum. In the case of aluminum tape an anodized coating thereon may provide the desired insulation. Each winding may also be formed by simultaneously winding a bare metal tape and a contiguous thin insulating tape 40′ such as of Mylar, slightly wider than the metal tape, thus providing insulation between successive convolutions of the metal tape.

In applying the winding section 37 to the yoke arm 19, the stator core is rotated about the longitudinal axis A—A of this arm, as indicated in FIG. 4, and the conductor ribbon or tape 40 is fed through a tubular stationary guide 41 which extends parallel to the yoke arm at such a distance therefrom as to be accommodated in the opening or gap 26 between the polar projections 21 and 23 during the rotation of the core. The guide has a curved and smoothly twisted elbow-forming delivery end 42 of flattened cross-section from which the conductor tape enters through the opening or gap 29 between the polar projections 23 and 24 of the core. When the winding section consists of bare metal tape and insulating tape both tapes are fed simultaneously through the guide 41. The winding section 39 on the same yoke arm is applied in a similar manner, the guide tube being accommodated in both of the pole openings or gaps 26 and 27 during the rotation of the core, as indicated by full and dotted lines in FIG. 4, and the conductor tape entering the space between the polar projection 24 and the yoke cross portion 30. The winding sections 35 and 38 on the yoke arm 18 are applied in a similar manner, the core being rotated about the longitudinal axis B—B of this yoke arm. Each winding section may consist of two or more coil units, two being shown, and each completed coil unit is shiftable along the core arm to accommodate the succeeding unit. The spirally wound coil units of each winding section are preferably spaced, as by thin slit insulating plates 43, and the windings are suitably retained in position, as by insulating varnish. In some cases, the conductor tape may be wound in bifilar fashion, so as to provide a capacitance effect.

In applying the phase windings, it is desirable to rotate the stator core and to hold the tape-guiding tube 41 against rotation, as above described, so as to simplify the tape-feeding operation, but in some instances this procedure may be reversed.

The stator field winding or phase winding consisting of the series-connected sections 38 and 39 are connected to single-phase line terminals 44 and 45, and the other stator field winding or phase winding, consisting of the series-connected sections 36 and 37, is also connected to these line terminals, but through a phase-shifting element such as a capacitor 46. Either of the phase winding circuits may include the phase-shifting element. In some instances, the phase-shifting element may be a resistor. If a two-phase current source is available, the two phase windings are connected to the respective line phases. The winding sections of each phase winding are preferably connected in series, as shown, but in some instances these winding sections may be connected in parallel.

When the motor is energized, the primary phase winding consisting of the series-connected field winding sections 38 and 39 produces an alternating magnetic flux $F_1$, FIG. 1, which passes through the yoke arms 18 and 19 and the yoke cross portion 20, and which also passes vertically through the rotor. One-half of this flux passes through the rotor between the polar projections 21 and 23 at the outer ends of the yoke arms, while the other half of this flux passes through the rotor between the inner polar projections 22 and 24. The placement of the field winding sections 38 and 39 on the stator yoke arms close to the polar projections 22 and 24 minimizes magnetic leakage. The other primary phase winding, consisting of the series-connected field winding sections 36 and 37, produces an alternating magnetic flux $F_2$, FIG. 2, which passes horizontally through the rotor. One half of the flux $F_2$ is produced by the winding section 36 and passes through the rotor between the polar projections 21 and 22 on the upper yoke arm 19, while the other half of the flux $F_2$ is produced by the winding section 37 and passes through the rotor between the polar projections 23 and 24 on the lower yoke arm 19. The two components of the field flux $F_2$ produced by the winding sections 36 and 37 have the same magnetic potential at any instant at the junctions of the inner polar projections 22 and 24 with the core arms 18 and 19, so that, except for a negligible amount of leakage flux, not shown, substantially none of the flux $F_2$ will pass through the cross portion 20 of the stator core yoke. The field fluxes $F_1$ and $F_2$ are out of phase by a substantial angle, which may approach 90 electrical degrees in some instances, thus providing a rotating magnetic field which sweeps through the squirrel-cage rotor, inducing currents in the rotor bars which react with the field flux to cause rotation of the rotor. Both phase windings preferably remain connected in circuit while the motor is running, although in some instances the current through one of the phase windings may be opened after the motor attains normal speed.

Alternating current motors constructed in accordance with the invention are particularly suitable for use in low power applications requiring inexpensive motors. Shaded-pole induction motors have been commonly used for such applications, but these motors have a poor efficiency and run quite hot.

The conventional squirrel-cage rotor 12 provided in the motor of FIG. 1 can be modified, as is well understood in this art, by removing equal small amounts of iron from opposite sides of the rotor core, whereupon the motor will still start as an induction motor but will run as a non-excited synchronous motor.

The modified form of electric motor 110 shown in FIG. 5 is of the synchronous type and comprises a wound stator 11 and a cooperating wound rotor 112, the stator 11 being identical with that of the motor of FIG. 1. The rotor 112 is here shown to comprise a shuttle-type core 114 mounted on a shaft 113 and carrying an exciting winding 115 adapted to be supplied with unidirectional current. If desired, the rotor core 114 may be provided with a damping winding 116. The motor may be started in any suitable manner, and will run synchronously with the line frequency. In one form of starting arrangement, the four stator winding sections may be commutated to produce a rotating field acting on the rotor. In some instances the rotor may be provided with permanent magnet excitation in place of the exciting winding.

The stator structure of the invention can also be embodied in a direct current motor if the field or stator windings thereof are commutated to produce a rotating magnetic field.

I claim:

1. A stator core for an electric motor, comprising an open-ended C-shaped yoke formed of one-piece laminations and including a pair of generally parallel arms and a cross portion connecting said arms, said yoke arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, two of said openings being disposed at regions midway between said arms, each yoke arm having a coil-receiving portion at a region between the outer and inner pole pieces on said arm, and each yoke arm further having a coil-receiving portion at a region between said cross portion and the adjacent inner pole piece, the said openings which are disposed midway between said arms presenting passages adapted to receive a conductor guide for winding coils on said yoke.

2. A stator core for an electric motor, comprising an open-ended C-shaped yoke formed of one-piece laminations and including a pair of generally parallel arms and a cross portion connecting said arms, said yoke arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, each yoke arm having a coil-receiving portion at a region between the pole pieces on said arm, and each yoke arm further having a coil-receiving portion at a region between said cross portion and the adjacent inner pole piece, said core being rotatable about the longitudinal axis of each arm for applying field winding sections on said coil-receiving portions of the arms.

3. A stator core for an electric motor, comprising an open-ended C-shaped yoke formed of one-piece laminations and having integrally formed on its inner side two pairs of outer and inner pole pieces defining a rotor tunnel, said pole pieces presenting four evenly spaced pole faces of substantially equal polar arc, there being openings between the adjacent pole pieces, said yoke having a coil-receiving portion between each adjacent pair of pole pieces, one of said openings being at the open end of said yoke and forming a passage adapted to receive a conductor guide for winding coils on said yoke.

4. A stator structure for an electric motor, comprising a magnetizable stator core including an open-ended C-shaped yoke formed by a pair of generally parallel arms and a cross portion connecting end portions of said arms, said arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, two of said openings being disposed at regions midway between said arms, a first field winding comprising a pair of winding sections surrounding said respective yoke arms at regions between the pairs of pole pieces on said arms, and a second field winding comprising a pair of winding sections surrounding said respective yoke arms at regions between said yoke cross portion and the adjacent inner pole pieces.

5. A stator structure for an electric motor, comprising a magnetizable stator core including an open-ended C-shaped yoke formed by a pair of generally parallel arms and a cross portion connecting end portions of said arms, said arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, a first field winding comprising a pair of winding sections surrounding said respective yoke arms at regions between the pairs of pole pieces on said arms, and a second field winding surrounding said yoke at a region thereof between the inner pole pieces on said arms.

6. A stator structure for an electric motor, comprising a magnetizable stator core including an open-ended C-shaped yoke formed by a pair of generally parallel arms and a cross portion connecting end portions of said arms, said arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, two of said openings being disposed at regions midway between said arms, a first field winding comprising a pair of winding sections surrounding said respective yoke arms at regions between the pairs of pole pieces on said arms, and a second field winding surrounding said yoke at a region thereof between the inner pole pieces on said arms, each field winding comprising a spirally wound conductor tape.

7. A stator structure for an electric motor, comprising a magnetizable stator core including an open-ended C-shaped yoke having integrally formed on its inner side two pairs of outer and inner pole pieces defining a rotor tunnel, said pole pieces presenting four evenly spaced pole faces of substantially equal polar arc, there being openings between the adjacent pole pieces, a first field winding comprising a pair of winding sections surrounding the yoke at regions between the respective pairs of outer and inner pole pieces, and a second field winding surrounding said yoke between the two inner pole pieces.

8. A stator structure for an alternating current motor, comprising a magnetizable stator core including an open-ended C-shaped yoke formed by a pair of generally parallel arms and a cross portion connecting end portions of said arms, said arms having integrally formed on their inner sides respective pairs of outer and inner pole pieces defining a rotor-receiving tunnel, said pole pieces presenting four evenly spaced pole faces of substantially equal polar arc, there being openings between adjacent pole pieces, a first field winding comprising a pair of winding sections surrounding said respective yoke arms at regions between the pairs of pole pieces on said arms, and a second field winding surrounding said yoke at a region thereof between the inner pole pieces on said arms, said first and second field windings forming primary phase windings excited in out-of-phase relation.

9. An alternating current motor comprising a stator and a cooperating rotor, said stator including a magnetizable core in the form of an open-ended C-shaped yoke defined by a pair of generally parallel arms and a cross portion connecting said arms, said yoke arms having at their inner sides respective pairs of outer and inner pole pieces defining a tunnel receiving said rotor, said pole pieces presenting four evenly spaced pole faces of substantially equal polar arc, there being openings between adjacent pole pieces, a first phase winding comprising a pair of winding sections surrounding said respective yoke arms between the outer and inner pole pieces on said yoke arms, and a second phase winding surrounding said yoke at a region thereof between the inner pole pieces of said arms, said first and second phase windings being primary windings and adapted to be traversed by currents differing in time phase for producing a rotating magnetic field flux in said rotor tunnel and rotor.

References Cited in the file of this patent

UNITED STATES PATENTS

| | | |
|---|---|---|
| 378,375 | Rechniewski | Feb. 21, 1888 |
| 1,275,292 | Neuland | Aug. 13, 1918 |
| 1,788,813 | Toewe | Jan. 13, 1931 |
| 2,205,077 | Zullo | June 18, 1940 |